(12) United States Patent
Kinrot et al.

(10) Patent No.: US 8,547,444 B2
(45) Date of Patent: Oct. 1, 2013

(54) NON-LINEAR TRANSFORMATIONS FOR ENHANCEMENT OF IMAGES

(75) Inventors: Uri Kinrot, Hod Hasharon (IL); Anatoly Litvinov, Binyamina (IL); Yoav Lavi, Ra'anana (IL); Irina Alon, Binyamina (IL); Alex Alon, Binyamina (IL)

(73) Assignee: DigitalOptics Corporation International, San Jose, CA (US)

( * ) Notice: Subject to any disclaimer, the term of this patent is extended or adjusted under 35 U.S.C. 154(b) by 790 days.

(21) Appl. No.: 12/663,205

(22) PCT Filed: Jun. 5, 2008

(86) PCT No.: PCT/IL2008/000769
§ 371 (c)(1),
(2), (4) Date: Apr. 13, 2010

(87) PCT Pub. No.: WO2008/149363
PCT Pub. Date: Dec. 11, 2008

(65) Prior Publication Data
US 2010/0283874 A1    Nov. 11, 2010

Related U.S. Application Data

(60) Provisional application No. 60/933,446, filed on Jun. 5, 2007, provisional application No. 61/072,132, filed on Mar. 26, 2008.

(51) Int. Cl.
*H04N 5/228* (2006.01)
(52) U.S. Cl.
USPC ............................... 348/222.1; 348/208.99

(58) Field of Classification Search
USPC .............. 348/222.1, 224.1, 208.99, 208.11, 348/241–242; 386/241, 242
See application file for complete search history.

(56) References Cited

U.S. PATENT DOCUMENTS

| 4,282,511 | A | 8/1981 | Southgate et al. | |
| 6,933,970 | B2 | 8/2005 | Koshiba et al. | |
| 7,728,844 | B2 * | 6/2010 | Trimeche et al. | 345/589 |
| 2001/0046320 | A1 * | 11/2001 | Nenonen et al. | 382/169 |
| 2002/0012055 | A1 * | 1/2002 | Koshiba et al. | 348/273 |
| 2002/0156821 | A1 | 10/2002 | Caron | |

(Continued)

FOREIGN PATENT DOCUMENTS

WO    WO 2007/054931 A2    5/2007

OTHER PUBLICATIONS

IPER Report, PCT Application No. PCT/IL2008/000769 dated Jan. 28, 2010 (2 pgs).

(Continued)

*Primary Examiner* — Roberto Velez
*Assistant Examiner* — Tuan Le
(74) *Attorney, Agent, or Firm* — Hickman Palermo Truong Becker Bingham Wong LLP

(57) ABSTRACT

Imaging apparatus (26) is provided for use with an image sensor (24). The apparatus includes a non-linear mapping circuit (42), which is configured to receive a raw stream of input pixel values generated by the image sensor and to perform a non-linear mapping of the input pixel values. to generate a mapped stream of mapped pixel values, and a linear convolution filter (44), which is arranged to filter the mapped stream of mapped pixel values to generate a filtered stream of filtered pixel values. Other embodiments are also described.

22 Claims, 10 Drawing Sheets

(56) References Cited

U.S. PATENT DOCUMENTS

| | | | |
|---|---|---|---|
| 2003/0169944 A1* | 9/2003 | Dowski et al. | 382/279 |
| 2004/0143565 A1* | 7/2004 | Berger et al. | 707/1 |
| 2005/0130321 A1 | 6/2005 | Nicholson et al. | |
| 2005/0276596 A1* | 12/2005 | Chan et al. | 396/296 |
| 2006/0013479 A1* | 1/2006 | Trimeche et al. | 382/167 |
| 2008/0012955 A1* | 1/2008 | Johnson et al. | 348/222.1 |
| 2008/0137947 A1* | 6/2008 | Sawada et al. | 382/167 |

OTHER PUBLICATIONS

Written Opinion of ISA, PCT Application No. PCT/IL2008/000769 dated Nov. 13, 2008 (4 pgs.).

Extended EP Search Report, EP Application No. 08 763 527.2 dated Jul. 14, 2010 (7 pgs.).

* cited by examiner

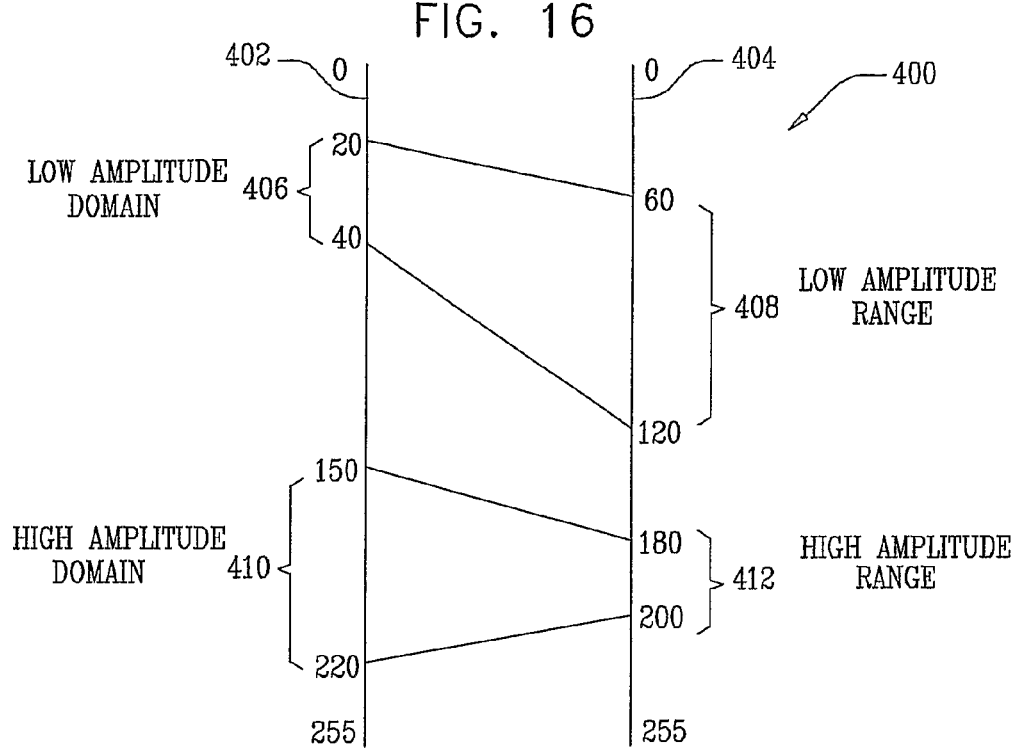
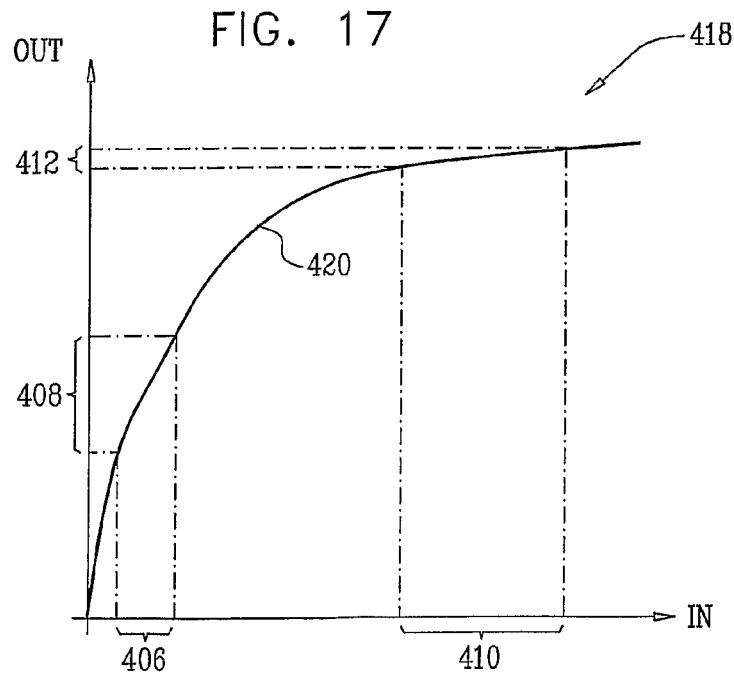

NON-LINEAR TRANSFORMATIONS FOR ENHANCEMENT OF IMAGES

CROSS-REFERENCE TO RELATED APPLICATIONS

The present application claims priority to PCT Application No. PCT/IL2008/000769, filed Jun. 5, 2008, which claims the benefit of the following US provisional applications, both of which are assigned to the assignee of the present application and are incorporated herein by reference:

U.S. Provisional Application 60/933,446, filed Jun. 5, 2007; and

U.S. Provisional Application 61/072,132, filed Mar. 26, 2008.

FIELD OF THE INVENTION

The present invention relates generally to digital image processing, and specifically to methods and devices for enhancing image quality in digital cameras.

BACKGROUND OF THE INVENTION

The objective optics used in digital cameras are typically designed so as to minimize the optical point spread function (PSF) and maximize the modulation transfer function (MTF), subject to the limitations of size, cost, aperture size, and other factors imposed by the camera manufacturer. The PSF of the resulting optical system may still vary from the ideal due to focal variations and aberrations.

A number of methods are known in the art for compensating for such PSF deviations by digital image processing. For example, U.S. Pat. No. 6,154,574, whose disclosure is incorporated herein by reference, describes a method for digitally focusing an out-of-focus image in an image processing system. A mean step response is obtained by dividing a defocused image into sub-images, and calculating step responses with respect to the edge direction in each sub-image. The mean step response is used in calculating PSF coefficients, which are applied in turn to determine an image restoration transfer function. An in-focus image is obtained by multiplying this function by the out-of-focus image in the frequency domain.

U.S. Pat. No. 7,077,810 to Alon et al., which is assigned to the assignee of the present application and is incorporated herein by reference, describes a method and system for processing a distorted digital image B that is a convolution of an undistorted image F and a point spread function. Noise is removed from the image B so as to produce an image B' of reduced noise. The image F is then obtained based upon a calculation involving the image B'.

US Patent Application Publication 2007/0236573 to Alon et al., which is incorporated herein by reference, describes a method for designing a camera, which includes objective optics for forming an image on an electronic image sensor and a digital filter for filtering an output of the image sensor. The method includes estimating an enhancement of the image that can be accomplished using the digital filter. A target optical specification for the camera is processed responsively to the estimated enhancement so as to determine a modified optical specification, and the objective optics are designed responsively to the modified optical specification.

PCT International Publication WO 2004/063989, whose disclosure is incorporated herein by reference, describes an electronic imaging camera, comprising an image sensing array and an image processor, which applies a deblurring function—typically in the form of a deconvolution filter (DCF)—to the signal output by the array in order to generate an output image with reduced blur. This blur reduction makes it possible to design and use camera optics with a poor inherent PSF, while restoring the electronic image generated by the sensing array to give an acceptable output image.

Low-cost color video cameras typically use a single solid-state image sensor with a multi-colored mosaic filter overlay. A mosaic filter is a mask of miniature color filter elements in which a filter element is positioned in front of each detector element of the image sensor. The filter elements in the mosaic filter generally alternate between the primary RGB colors, or between the complementary colors cyan, magenta and yellow. One common type of color mosaic filter is called a "Bayer sensor" or "Bayer mosaic," which is described in U.S. Pat. No. 3,971,065, whose disclosure is incorporated herein by reference.

Processing the image produced by a mosaic image sensor typically involves reconstructing the full color image by extracting three color signals (red, green and blue) from the sensor output. An image signal processor (ISP) processes the image sensor output in order to compute luminance (Y) and chrominance (C) values for each pixel of the output image. The ISP then outputs these values (or the corresponding R, G and B color values) in a standard video format.

PCT International Publication WO 2007/054931, which is assigned to the assignee of the present patent application and whose disclosure is incorporated herein by reference, describes methods and devices for image enhancement in the mosaic domain. A mosaic image sensor outputs a stream of pixel values belonging to a plurality of input sub-images, each of which is due to light of a different, respective color that is incident on the sensor. An image restoration circuit filters the pixel values in each of the input sub-images so as to generate corresponding output sub-images with enhanced quality, such as with reduced blur. An image signal processor (ISP) then combines the output sub-images so as to generate a color video output image.

SUMMARY OF THE INVENTION

Embodiments of the present invention provide methods and devices for processing and enhancement of electronic images. An image sensor outputs a stream of input pixels values which suffer from an input blur. An image restoration circuit performs a non-linear mapping of the input pixel values to generate a mapped stream of output pixel values, and performs linear convolution filtering of the mapped stream of output pixel values to generate a filtered pixel stream with enhanced quality, such as with reduced blur. Typically, the images are produced using objective optics characterized by a point spread function (P SF) that causes the input blur, and the image restoration circuit includes a deconvolution filter (DCF), having a filter kernel determined according to the PSF.

The non-linear mapping typically spreads a portion of the input pixels with relatively low values over a larger range of output values, and contracts a portion of the input pixels with relatively high-amplitude values to a narrower range of output values. The mapping thus minimizes artifacts in the output pixel stream near low-illumination pixels. In some embodiments, the image restoration circuit performs a second non-linear mapping, generally inverse to the initial non-linear mapping, on the filtered pixel stream, in order to cancel a distortion of the input pixels caused by the initial non-linear mapping.

In some embodiments of the present invention, the image restoration circuit performs the non-linear mapping using a piecewise linear function. Alternatively or additionally, the image restoration circuit uses one or more look-up tables to approximate a continuous non-linear function, in order to mitigate any distortion in the output pixel stream that might otherwise be caused by sharp angles between segments of the piecewise linear function.

In some embodiments of the present invention, the image sensor comprises a mosaic image sensor, which outputs a stream of pixel values belonging to a plurality of input sub-images, each of which is due to light of a different, respective color that is incident on the mosaic image sensor. Following the non-linear mapping and linear convolution filtering, which generate corresponding output sub-images with enhanced quality, such as with reduced blur, an image signal processor (ISP) combines the output sub-images so as to generate a color video output image.

There is therefore provided, in accordance with an embodiment of the present invention, imaging apparatus for use with an image sensor, the apparatus including:

a non-linear mapping circuit, which is configured to receive a raw stream of input pixel values generated by the image sensor and to perform a non-linear mapping of the input pixel values to generate a mapped stream of mapped pixel values; and a linear convolution filter, which is arranged to filter the mapped stream of mapped pixel values to generate a filtered stream of filtered pixel values.

In disclosed embodiments, the image sensor generates the raw stream of input pixel values responsively to light that is incident on the sensor via objective optics that are characterized by a point spread function (PSF), which gives rise to an input blur, and the linear convolution filter includes a deconvolution filter which has a filter kernel determined according to the PSF. Typically, the non-linear mapping circuit is configured to perform the non-linear mapping on each of the input pixel values individually, irrespective of any neighboring input pixel values. Additionally or alternatively, the raw stream typically includes at least 100,000 of the input pixel values, and the non-linear mapping circuit is configured to perform the non-linear mapping such that at least 10% of the mapped pixel values are different from the corresponding input pixel values.

In some embodiments, the non-linear mapping circuit includes a first non-linear mapping circuit, wherein the non-linear mapping includes a first non-linear mapping, and the apparatus includes a second non-linear mapping circuit, which is arranged to perform a second non-linear mapping of the filtered pixel values. Typically, the first non-linear mapping has a first functional characteristic, and the second non-linear mapping has a second functional characteristic that is inverse to the first functional characteristic over at least a portion of a range of allowable filtered pixel values.

In a disclosed embodiment, the raw stream of input pixel values includes an input subset of relatively low-amplitude pixel values characterized by an input range of amplitude values, and the non-linear mapping circuit is configured to perform the non-linear mapping of the low-amplitude pixel values to a mapped subset of the mapped pixel values characterized by a mapped range of amplitude values that is greater than the input range of amplitude values. Additionally or alternatively, the non-linear mapping includes a power law transformation, and the non-linear mapping circuit is configured to perform the power law transformation.

Further additionally or alternatively, the non-linear mapping uses a piecewise linear function, and the non-linear mapping circuit is configured to implement the piecewise linear function. In one embodiment, the non-linear mapping circuit is configured to use curve approximation to smooth knees in the piecewise linear function. Additionally or alternatively, the piecewise linear function includes a plurality of segments, and the non-linear mapping circuit includes a sparse lookup table having respective entries that specify the segments.

In a disclosed embodiment, the image sensor is a mosaic image sensor, and wherein the raw stream of input pixel values belongs to a plurality of interleaved input sub-images, each sub-image responsive to light of a different, respective color that is incident on the mosaic image sensor, and the non-linear mapping circuit is configured to generate a plurality of interleaved output sub-images respectively, and the apparatus includes an image signal processor (ISP), which is coupled to receive and combine the plurality of the output sub-images in order to generate a color video output image.

In one embodiment, the non-linear mapping circuit is configured to dynamically alter the non-linear mapping responsively to one or more characteristics of the input pixel values.

There is also provided, in accordance with an embodiment of the present invention, a method for imaging, including:

receiving a raw stream of input pixel values generated by an image sensor;

digitally performing a non-linear mapping of the input pixel values to generate a mapped stream of mapped pixel values; and applying a linear convolution filter to the mapped stream of mapped pixel values to generate a filtered stream of filtered pixel values.

The present invention will be more fully understood from the following detailed description of the embodiments thereof, taken together with the drawings in which:

BRIEF DESCRIPTION OF THE DRAWINGS

FIG. 16 is a schematic illustration of an exemplary non-linear mapping, in accordance with an embodiment of the present invention; and FIG. 17 is an exemplary graph including a curve representing the exemplary non-linear mapping depicted in FIG. 16, in accordance with an embodiment of the present invention.

DETAILED DESCRIPTION OF EMBODIMENTS

Figure 1:
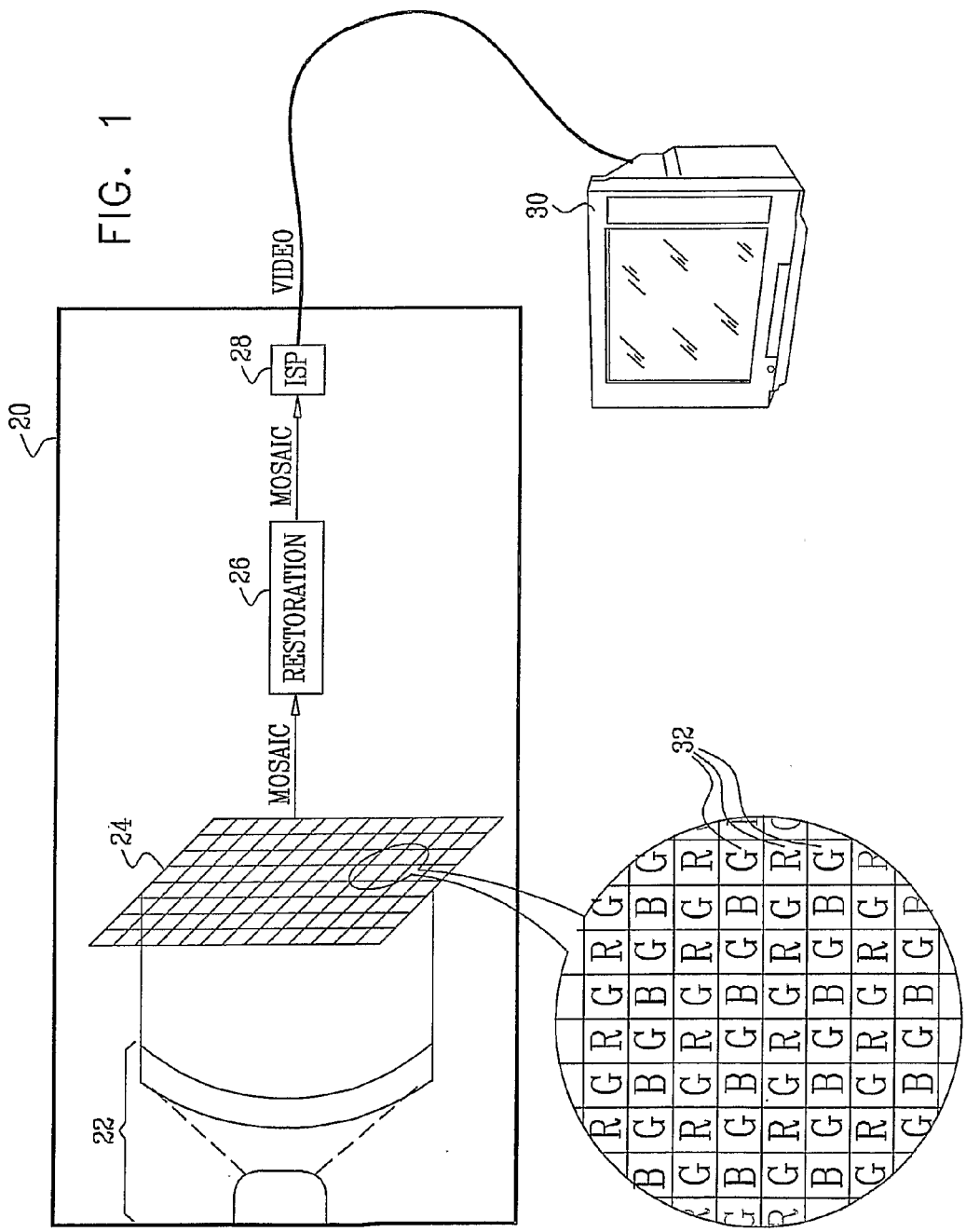
FIG. 1 is a block diagram that schematically illustrates an electronic imaging camera, in accordance with an embodiment of the present invention.

FIG. 1 is a block diagram that schematically illustrates an electronic imaging camera 20, in accordance with an embodiment of the present invention. This specific, simplified camera design is shown here by way of example, in order to clarify and concretize the principles of the present invention. These principles, however, are not limited to this design, but may rather be applied in reducing the blur in images in imaging systems of other types, for example, in which a sensor produces multiple sub-images of different colors, which are then combined to produce an enhanced color output image.

In an embodiment of the present invention, in camera 20, objective optics 22 focus light from a scene onto a mosaic image sensor 24. Objective optics 22 is characterized by a point spread function (PSF) that gives rise to an input blur in the received image. Any suitable type of image sensor, such as a CCD or CMOS image sensor, may be used in the camera. In this example, as well as in the description that follows, the sensor is assumed to have a mosaic filter, e.g., a Bayer-type mosaic filter, so that each pixel 32 in the image signal output by the sensor is responsive to either red, green or blue light. Thus, the mosaic sensor output can be seen as comprising red, green and blue sub-images, made up of the pixel values of the corresponding sensor element.

The stream of pixel values output by image sensor 24 is received and processed by a digital restoration circuit 26. This circuit is described in detail with reference to the figures that follow. The pixel values are digitized prior to processing by circuit 26 by an analog/digital converter (not shown in the figures), which may be integrated with either sensor 24 or circuit 26 or may be a separate component. In any case, circuit 26 processes the red, green and blue input sub-images that are produced by sensor 24 in order to reduce the image blur, as described hereinbelow. Circuit 26 then outputs red, green and blue sub-images with reduced blur.

Typically, circuit 26 outputs the sub-images in the same format in which it received the sub-images from sensor 24. For example, circuit 26 may interleave the pixel values in the output sub-images to generate a single output stream, in which the pixel values have the same interleaving as the input pixel values from sensor 24. Alternatively, circuit 26 may be configured to demultiplex and output each sub-image as a separate data block or data stream.

An image signal processor (ISP) 28 receives the deblurred red, green and blue output sub-images from restoration circuit 26 and processes the sub-images together to generate a color video output image (or image sequence) in a standard video format. This output image may be displayed on a video screen 30, as well as transmitted over a communication link and/or stored in a memory. In embodiments in which circuit 26 outputs the sub-images in the same format in which it received the sub-images from sensor 24, ISP 28 may be used interchangeably to process either the output of circuit 26 or to process the output of sensor 24 directly.

Further details pertaining to the components described in FIG. 1 are found in the above-mentioned PCT International Publication WO 2007/054931.

Typically, restoration circuit 26 and ISP 28 are embodied in one or more integrated circuit chips, which may comprise either custom or semi-custom components. Although restoration circuit 26 and ISP 28 are shown as separate functional blocks in FIG. 1, the functions of the restoration circuit and the ISP may be implemented in a single integrated circuit component. Optionally, image sensor 24 may be combined with circuit 26 and possibly also ISP 28 on the same semiconductor substrate in a system-on-chip (SoC) or camera-on-chip design. Alternatively, some or all of the functions of restoration circuit 26 and ISP 28 may be implemented in software on a programmable processor, such as a digital signal processor. This software may be downloaded to the processor in electronic form, or it may alternatively be provided on tangible media, such as optical, magnetic or electronic memory media.

Figure 2:
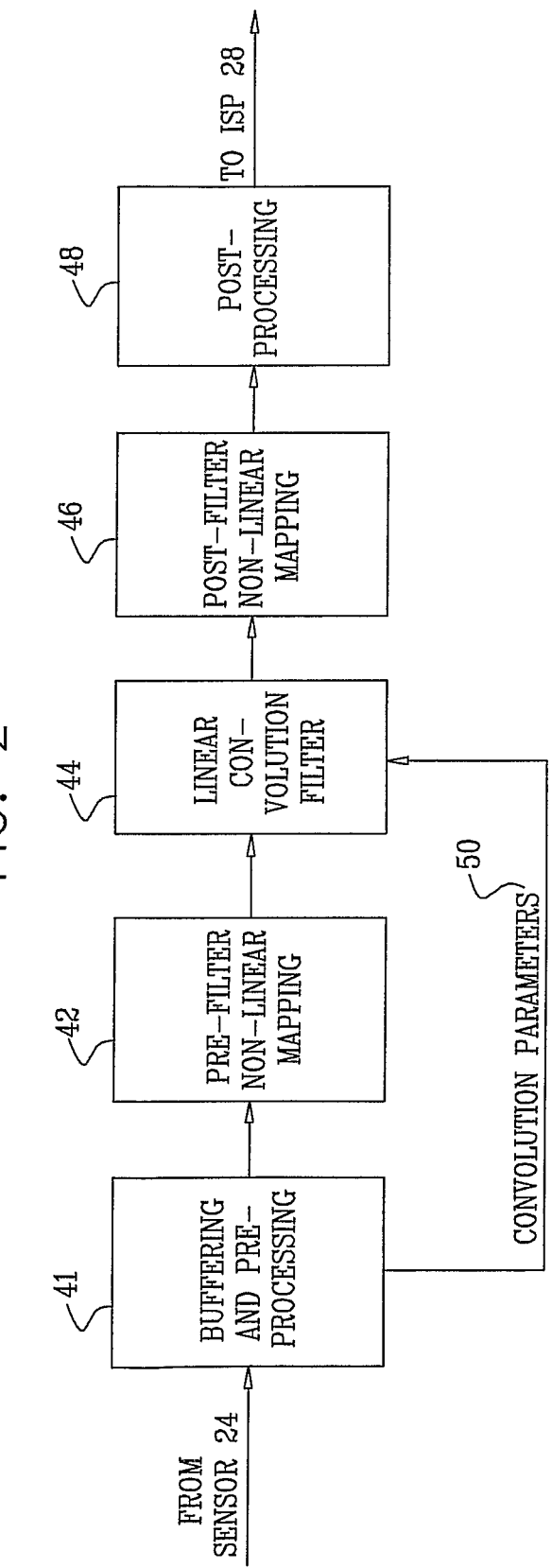
FIG. 2 is a block diagram that schematically shows functional components of an image restoration circuit, in accordance with an embodiment of the present invention.

FIG. 2 is a block diagram that schematically shows functional components of restoration circuit 26, in accordance with an embodiment of the present invention. Typically, these functional components are embodied together in a single custom or semi-custom integrated circuit device. In this example, as well as in the description that follows, the functional components are assumed to be implemented using digital hardware components. Alternatively, the functions shown in FIG. 2 may be divided among a number of components, which may carry out the functions in hardware or software.

In the exemplary embodiment shown in FIG. 2, circuit 26 performs image restoration by linear convolution filtering, e.g., deconvolution filtering, to reduce blur of the sub-images before they are processed by ISP 28 to generate a color output image, typically in RGB or Y—Cr—Cb format. Prior to the linear convolution filtering, circuit 26 performs a non-linear mapping of the raw stream of pixel values of each of the sub-images output by image sensor 24 to generate respective mapped streams of pixel values for each of the sub-images. The non-linear mapping deterministically maps each allowable input value to exactly one respective output value (although a plurality of input values may be mapped to a single output value). Circuit 26 typically performs the non-linear mapping on each pixel in isolation, irrespective of the values of other pixels in the pixel stream, such as neighboring pixels. Typically, circuit 26 implements a non-decreasing non-linear mapping. Typically, circuit 26 alters the value of at least 10% of the pixels in the raw pixel stream, such as at least 20% or at least 30% of the pixels in the raw pixel stream. For some applications, as described hereinbelow with reference to FIGS. 3-6, circuit 26 may use a piecewise linear function to perform the non-linear mapping. Alternatively or additionally, the circuit may use one or more look-up tables to perform the non-linear mapping. Other techniques for performing the non-linear mapping will be apparent to those skilled in the art who have read the present application, and are within the scope of the present invention. Typically, the raw stream includes at least 100,000 input pixels, such as at least one million input pixels. For some applications, circuit 26 performs an additional non-linear mapping of the pixel stream output from the linear convolution filter, such as described hereinbelow with reference to FIGS. 5 and 8.

A buffering and pre-processing unit 41 performs various functions on the input pixels, in addition to buffering the input pixels while circuit 26 is operating on them. Typically, pre-processing unit 41 performs image restoration functions on the sub-images, such as spike removal, noise filtering, edge detection, and frame widening. Alternatively or additionally, pre-processing unit 41 may be configured to carry out only one or two of these restoration functions, or to carry out additional digital filtering functions in the space of the mosaic sub-images. For example, pre-processing unit 41 may implement techniques described in the above-mentioned PCT International Publication WO 2007/054931. Although some of these steps, such as spike removal, may involve non-linear operations, they do not constitute non-linear mapping in the sense that is defined hereinabove.

A pre-filter non-linear mapping unit 42 performs a non-linear mapping of the input pixels. For some applications, the non-linear mapping unit uses digital hardware to implement the non-linear mapping, as described hereinbelow with reference to FIG. 4. Typically, non-linear mapping unit 42 uses a piecewise linear function to implement the non-linear mapping, as described hereinbelow with reference to FIG. 3. For some applications, in order to avoid image artifacts caused by knees in the piecewise linear function, non-linear mapping unit 42 uses curve approximation to smooth the knees, as described hereinbelow with reference to FIG. 10. For other applications, non-linear mapping unit 42 uses a sparse look-up table to implement the non-linear mapping, as described hereinbelow with reference to FIGS. 12-13.

In an embodiment of the present invention, non-linear mapping unit 42 implements several different non-linear mappings, and decides which to perform on the pixels output by image sensor 24. For some applications, non-linear mapping unit 42 decides based on a static configuration, for example, a configuration register of circuit 26. For other applications, non-linear mapping unit 42 decides which mapping to use dynamically, responsively to one or more characteristics of the input pixel stream.

In an embodiment of the present invention, non-linear mapping unit 42 performs different non-linear mappings on each of the sub-images received from sensor 24. For instance, the non-linear mapping unit may use different non-linear mappings corresponding to different deconvolution kernels that are applied to the different sub-images, as described hereinbelow. As one example, the non-linear mapping unit may apply a more aggressive mapping (with a steeper slope at low pixel values, as illustrated in the figures that follow) to the sub-images that have a more aggressive filter kernel (with a stronger high-pass filtering effect).

A linear convolution filter, such as a deconvolution filter (DCF) 44, performs a deblurring operation on the pixel stream output by non-linear mapping unit 42, typically for each of the sub-images individually. Filter 44 typically uses one or more kernels that are roughly inverse to the point spread function (PSF) of optics 22, in order to "undo" the effects of the aberrations of the optics. Methods for computing deconvolution kernels of this sort are described, for example, in the above-mentioned PCT International Publication WO 2004/063989, as well as in the above-mentioned U.S. Patent Application Publication 2007/0236573. Alternatively, other sorts of filter kernels may be applied by filter 44, whether for deblurring or for other image processing functions that are known in the art. The kernels are typically masked so that each of the sub-images is filtered independently of the other sub-images, notwithstanding the interleaving of the sub-images in the input pixel stream. Techniques of masking the kernels are explained, for example, in the above-mentioned PCT International Publication WO 2007/054931.

In many cameras, the PSF of the optics is not uniform over the entire field of view of the camera. Thus, in camera 20, for example, different areas of image sensor 24 may be subject to different PSF profiles. Therefore, for optimal deblurring, filter 44 may use different filter kernels for pixels in different parts of the image. Techniques of this sort are also explained, for example, in PCT International Publication WO 2007/054931.

Additionally or alternatively, filter 44 may change the set of filter kernels on the fly, depending on the characteristics of the image captured by camera 20 (and hence of the input sub-images). Buffering and pre-processing block 41 supplies convolution parameters 50 to filter 44, such as image illumination level, type of image content, or other image information, which parameters filter 44 may use to choose among the different filter kernels. For some applications, the kernels may be varied depending on both the location of the current pixel in the image plane and on other factors, such as the image distance. The optics and DCF kernels may be chosen to provide specific image enhancement functions, such as increasing the effective depth of field of camera 20. Alternatively, the arrangement of filter 44, with different filtering operations applied in alternation to sub-images of different colors, may be used to carry out a wide variety of other image enhancement functions in the mosaic color space.

In an embodiment of the present invention, circuit 26 comprises a post-filter non-linear mapping unit 46, which performs a post-filter non-linear mapping of pixels output from filter 44. Post-filter non-linear mapping unit 46 uses a non-linear mapping function different from the mapping function used by pre-filter non-linear mapping unit 42, described above. For some applications, the post-filter unit uses digital hardware to implement the non-linear mapping, as described hereinbelow with reference to FIGS. 6 and 9. Typically, the post-filter non-linear mapping is generally the inverse of the non-linear mapping performed by pre-filter unit 42, at least for a portion of the pixel values, as described hereinbelow with reference to FIGS. 5 and 8, so as to reverse the effect of the pre-filter mapping and to prevent distortion in the sub-images output to ISP 28. Optionally, post-filter mapping unit 46 may implement a plurality of non-linear mappings and decide which mapping to use based on either a static configuration or in real-time, responsively to input from buffering and pre-processing block 41.

A post-processing unit 48 performs further processing operations on the sub-images, before outputting the deblurred sub-images to ISP 28. Examples of post-processing operations are described in, for example, the above-mentioned U.S. Provisional Application 60/933,446.

For some applications, circuit 26 does not perform the post-filter non-linear mapping, and instead directly provides the output from filter 44 as input to post-processing unit 48.

Mode 1—Piecewise Linear Estimation without Smoothing

Figure 3:
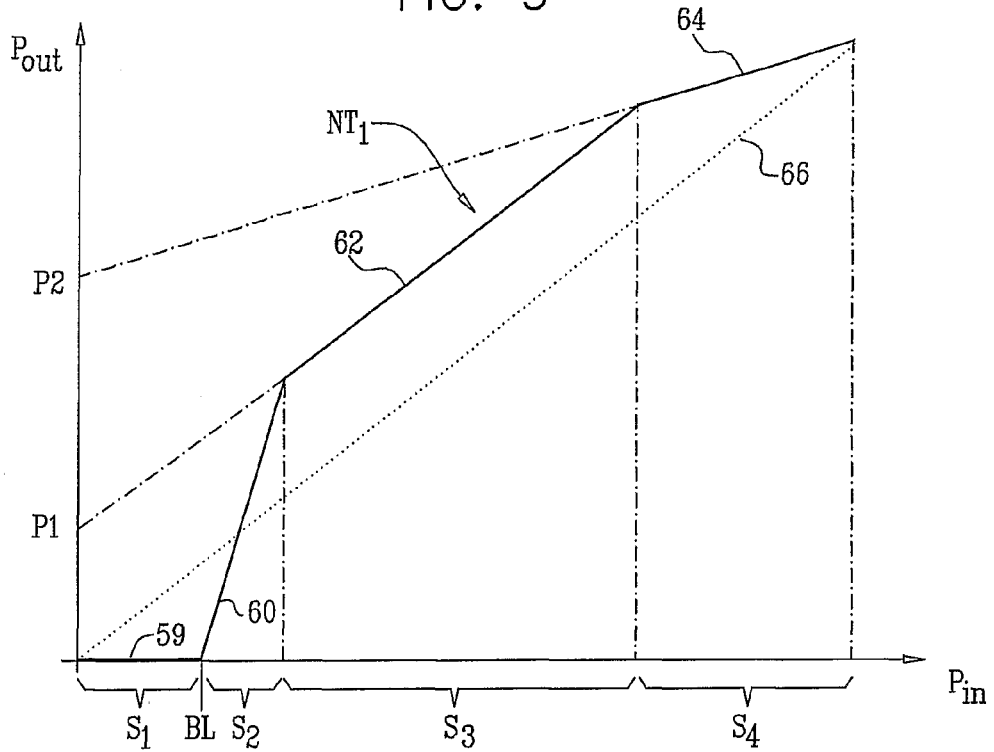
FIG. 3 is a graphical illustration of a piecewise linear function that implements a non-linear mapping, in accordance with an embodiment of the present invention.

FIG. 3 is a graphical illustration of a piecewise linear function $NT_1$, which implements a non-linear mapping, in accordance with an embodiment of the present invention. Function $NT_1$ uses four line segments to implement the mapping, which transforms input pixels $p_{in}$ to $p_{out}$. The function is expressed mathematically by Equation 1 below. Additional piecewise linear functions that implement non-linear mappings will be evident to those skilled in the art who have read the present application, and are within the scope of the present invention. Functions $NT_1$ and $NT_3$ (described hereinbelow with reference to FIG. 7) are typically non-decreasing (although they may be decreasing at some points due to undesirable rounding errors). In the description of FIG. 3 that follows, certain numerical values are given, by way of example, for the parameters of the function, such as range limits, slopes and intercepts, but these values are given solely by way of example and not limitation. These parameters are, for the most part, configurable and may be varied depending on application requirements and image features.

The function uses a first line segment 59 to transform input pixels having input values in a first range $S_1$ to the value 0, or to another low value near 0. Range $S_1$ extends from 0 to a parameter BL, which represents the "black level" of the function, i.e., the value of the pixels below which no meaningful information is expected from the sensor. Typically, parameter BL is a low number, and may be zero.

The function uses a second line segment 60, having a slope $M_1$ greater than 1, such as a positive integer power of 2, for example 2 or 4, and an x-intercept equal to parameter BL, to transform input pixels having input values in a second range $S_2$. The low end of range $S_2$ equals BL, and the high end of $S_2$ is typically set to a value between 5% and 25% of the maximum allowable input value. For example, for implementations in which the allowable input value range is 0 to 1023, the high end of $S_2$ is typically 128, but any other suitable value may be used. For some applications, the high end of $S_2$ may even be the highest allowable input value.

The function uses a third line segment 62, having a slope of 1, for example, and a y-intercept equal to a parameter P1, having a typical value of between 0 and 512, such as 100, to transform input pixels having input values in a third range $S_3$. Range $S_3$ extends from the high end of range $S_2$ to an upper limit that is typically between 50% and 90% of the maximum allowable input value, but is, again, adjustable and may extend up to the highest allowable input value.

The function uses a fourth line segment 64, having a slope $M_2$ less than 1, such as a negative integer power of 2, for example 0.5 or 0.25, and a y-intercept equal to a parameter P2, to transform input pixels having input values in a fourth range $S_4$. On the ten-bit scale mentioned above, P2 typically has a value of between 512 and 1023, such as 768. Range $S_4$ extends from the high end of range $S_3$ to the maximum allowable input value.

FIG. 3 shows the straight line $p_{out}=p_{in}$ as a line segment 66 for reference. As noted earlier, the bounds of ranges $S_1$, $S_2$, $S_3$ and/or $S_4$ may be adjustable parameters, which may be configured by setting appropriate values in one or more configuration registers.

$$p_{out} = \begin{cases} 0, & p_{in} \in S_1; \\ M_1(p_{in} - BL), & p_{in} \in S_2; \\ p_{in} + P1, & p_{in} \in S_3; \\ M_2 p_{in} + P2, & p_{in} \in S_4; \end{cases} \quad \text{(Equation 1)}$$

Figure 4:
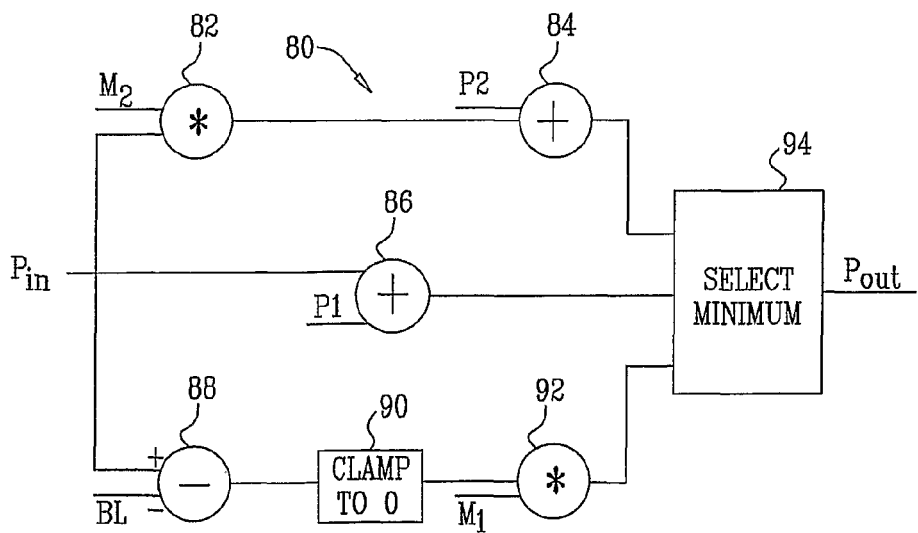
FIG. 4 is a schematic illustration of a digital hardware circuit that implements the piecewise linear function depicted in FIG. 3, in accordance with an embodiment of the present invention.

FIG. 4 is a schematic illustration of a digital hardware circuit 80 that implements piecewise linear function $NT_1$, in accordance with an embodiment of the present invention. Additional circuits for implementing function $NT_1$ will be evident to those skilled in the art who have read the present application, and are within the scope of the present invention. When a range of values is given for parameters in this figure, as well as in the figures that follow, circuit 26 may comprise digital hardware that implements a specific function for several different values in the range. For some applications, circuit 26 uses a control input or a static configuration bit to choose from among the values. Additionally or alternatively, circuit 26 may choose from among the values on the fly, for example, according to parameters of the sub-images. Circuit 80 transforms an input pixel value $p_{in}$, comprising, for example, 8 or 10 bits, to an output pixel value $p_{out}$, comprising, for example, 8 or 10 bits in accordance with the function given in Equation 1 above: A first multiplier element 82 multiplies input value $p_{in}$ by slope $M_2$. For applications in which circuit 80 sets slope $M_2$ to either 0.5 or 0.25, as described hereinabove, circuit 80 implements multiplier 82 using two bit-shifting elements, which shift input value $p_{in}$ to the right by one or two bits, respectively, and a multiplexer to choose between the two bit-shifted values. Alternatively, circuit 80 shifts input value $p_{in}$ to the right by an appropriate number of bits for values of slope $M_2$ equal to any negative integer power of 2. Further alternatively, circuit 80 allows any value less than 1 for slope $M_2$.

A first adder element 84 adds parameter P2 to the output of multiplier 82. A second adder element 86 adds parameter P1 to input value $p_{in}$. A subtractor element 88 subtracts parameter BL from input value $p_{in}$. A clamp-to-zero element 90 outputs 0 if the output of subtractor 88 is less than or equal to 0 (i.e., if the value of input pixel $p_{in}$ is less than or equal to parameter BL), and passes through the output of subtractor 88 if the output is greater than 0. Input pixels with values less than BL thus generate a value of 0 at the output of clamp-to-zero element 90, in accordance with function $NT_1$. A second multiplier element 92 multiplies the output of clamp-to-zero element 90 by slope $M_1$. For applications in which circuit 80 sets slope $M_2$ to either 2 or 4, as described hereinabove, circuit 80 implements multiplier 92 using two bit-shifting elements, which shift the output of clamp-to-zero element 90 to the left by one or two bits, respectively, and a multiplexer to choose between the two bit-shifted values. Alternatively, circuit 80 shifts the output of clamp-to-zero element 90 to the left by an appropriate number of bits for values of slope $M_1$ equal to any positive integer power of 2. Further alternatively, circuit 80 allows any value greater than 1 for slope $M_1$.

The outputs of adder 84, adder 86, and multiplier 92 enter into a select-minimum block 94, which chooses the minimum values from among its inputs. Since the slopes of the line segments that comprise the function $NT_1$ are positive and decrease as $p_{in}$ moves from BL towards infinity, the output of select-minimum block 94 provides the correct $p_{out}$ for all values of $p_{in}$. For some applications, circuit 80 implements select-minimum block 94 using two comparators and two multiplexers.

Figure 5:
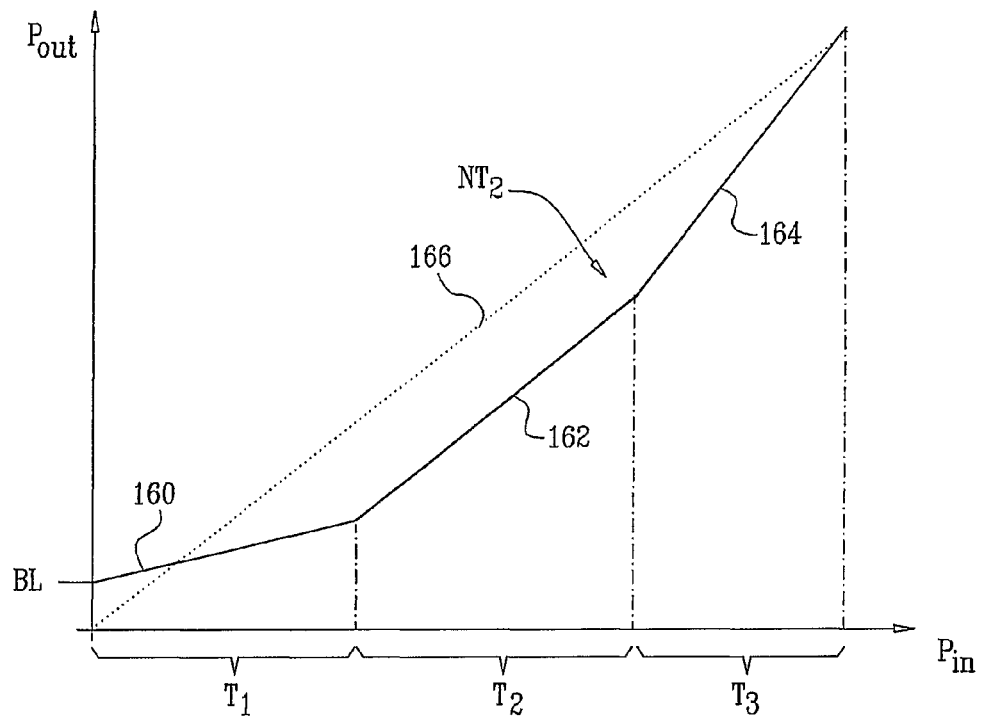
FIG. 5 is a graphical illustration of a piecewise linear function that implements a non-linear mapping that is generally inverse to the non-linear mapping depicted in FIG. 3, in accordance with an embodiment of the present invention.

FIG. 5 is a graphical illustration of a piecewise linear function $NT_2$, expressed in Equation 2 below, which implements a non-linear mapping that is generally inverse to the non-linear mapping implemented in function $NT_1$, in accordance with an embodiment of the present invention. Typically, function $NT_1$, described hereinabove with reference to FIGS. 3 and 4, has a first functional characteristic, and function $NT_2$ has a second functional characteristic that is inverse to the first functional characteristic over at least a portion of the range of pixel values. For example, the first functional characteristic may be a coefficient or a slope applicable to a portion of the pixel values, such as to a segment of the function, and the second functional characteristic may be the inverse, e.g., the reciprocal of the coefficient or the slope. For cases in which function $NT_1$ includes a vertical segment (such as in range $S_1$ in FIG. 3), $NT_2$ typically does not use this segment. In the exemplary function shown in FIG. 5, for input values of $p_{in}=0$, the output of $NT_2$ is equal to the parameter BL (which may be equal to zero), but the output for $p_{in}=0$ may alternatively be set to another value. Similarly, as in FIG. 3, values of the parameters of $NT_2$ are given here by way of example, and any other suitable values may be used.

Function $NT_2$ uses three line segments to implement the mapping, which transforms input pixels $p_{in}$ to output pixels $p_{out}$. The function maps the point $(p_{in}=0)$ to the point $(p_{out}=BL)$. The function uses a first line segment 160, having a slope $(1/M_1)$ and a y-intercept equal to parameter BL, to transform input pixels having input values in a range $T_1$. The function uses a second line segment 162, which in this example has a slope of 1, and a y-intercept equal to the additive inverse of parameter P1, to transform input pixels in range a $T_2$. The function uses a third line segment 164, having a slope $(1/M_2)$ and a y-intercept equal to the additive inverse of parameter P2, to transform input pixels having input values in a range $T_3$. FIG. 5 shows the straight line $p_{out}=p_{in}$ as a line segment 166 for reference. Typically, ranges $T_1$, $T_2$, and $T_3$ correspond to the ranges of values to which function $NT_1$ maps input pixels having input values in range $S_2$, $S_3$, and $S_4$, respectively. For some applications, the bounds of ranges $T_1$, $T_2$, and/or $T_3$ may be adjustable parameters, which may be configured by setting appropriate values in one or more configuration registers.

$$p_{out} = \begin{cases} BL, & p_{in} = 0; \\ \frac{p_{in}}{M_1} + BL, & p_{in} \in T_1; \\ p_{in} - P1, & p_{in} \in T_2; \\ \frac{(p_{in} - P2)}{M_2}, & p_{in} \in T_3; \end{cases} \quad \text{(Equation 2)}$$

Figure 6:
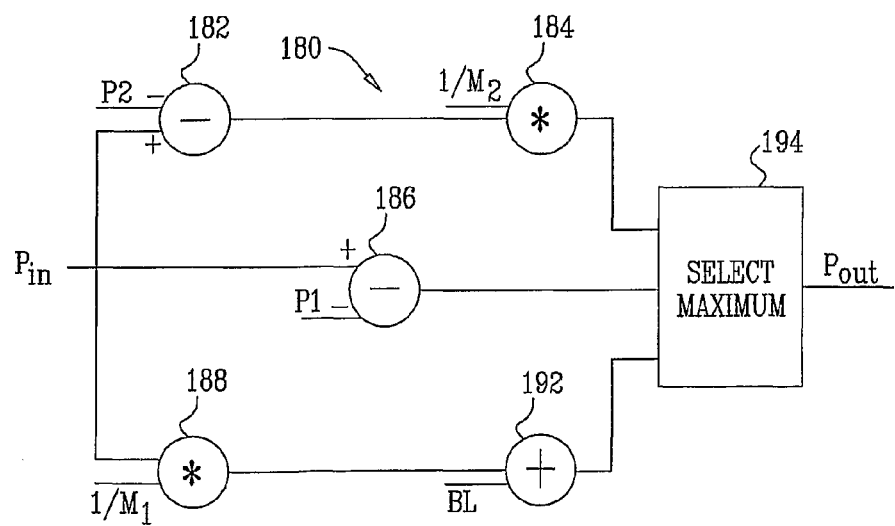
FIG. 6 is a schematic illustration of a digital hardware circuit that implements the piecewise linear function depicted in FIG. 5, in accordance with an embodiment of the present invention.

FIG. 6 is a schematic illustration of a digital hardware circuit 180 that implements piecewise linear function $NT_2$, in accordance with an embodiment of the present invention. Additional circuits for implementing function $NT_2$ will be evident to those skilled in the art who have read the present application, and are within the scope of the present invention. Circuit 180 transforms an input pixel value $p_{in}$, comprising, for example, 8 or 10 bits, to an output pixel value $p_{out}$, comprising, for example, 8 or 10 bits, in accordance with the function given above in Equation 2. A first subtractor element 182 subtracts parameter P2 from input value $p_{in}$. For applications in which circuit 180 sets parameter P2 as a negative number, subtractor element 182 may subtract parameter P2 from input value $p_{in}$ by adding the absolute value of parameter P2 to input value $p_{in}$. A first multiplier element 184 multiplies the output of subtractor 182 by the inverse of slope $M_2$. For applications in which circuit 80 sets slope $M_2$ equal to either 2 or 4, as described hereinabove, circuit 180 may implement multiplier 184 using two bit-shifting elements, which shift the output of subtractor 182 to the right by one or two bits, respectively, and a multiplexer to choose between the two bit-shifted values. A second subtractor element 186 subtracts parameter P1 from input value $p_{in}$. A second multiplier element 188 multiplies the input value $p_{in}$ by the inverse of slope $M_1$. For applications in which circuit 80 sets slope $M_1$ equal to either 0.5 or 0.25, as described hereinabove, circuit 180 may implement multiplier 188 using two bit-shifting elements, which shift input value $p_{in}$ to the left by one or two bits, respectively, and a multiplexer to choose between the two bit-shifted values. An adder element 192 adds parameter BL to the output of multiplier 188. The outputs of adder 192, multiplier 184, and subtractor 186 enter into a select-maximum block 194, which chooses the maximum values from among its inputs. Since the slopes of the line segments that comprise the function $NT_2$ are positive and increase as $p_{in}$ moves from 0 towards infinity, the output of select-maximum block 194 provides the correct $p_{out}$ for all values of $p_{in}$. For some applications, circuit 180 implements select-maximum block 194 using two comparators and two multiplexers.

Figure 7:
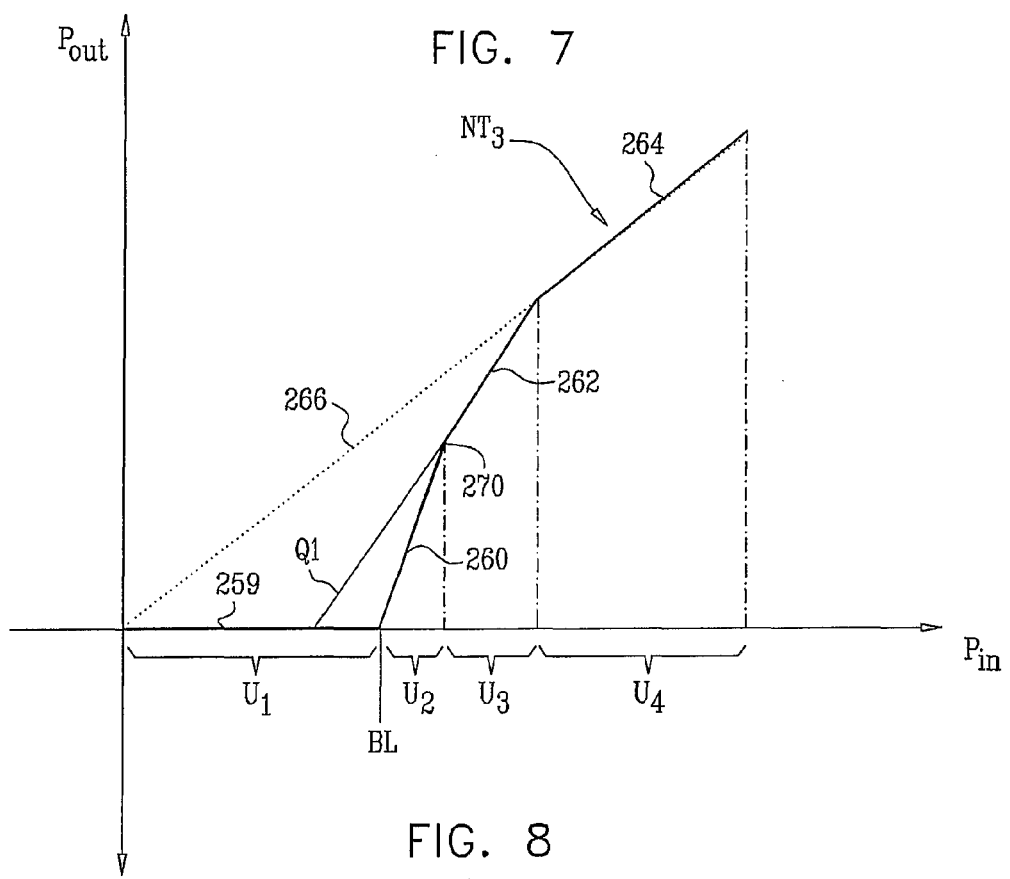
FIG. 7 is a graphical illustration of a piecewise linear function that implements another non-linear mapping, in accordance with an embodiment of the present invention.

FIG. 7 is a graphical illustration of a piecewise linear function $NT_3$, which implements another non-linear mapping, in accordance with an embodiment of the present invention. Function $NT_3$ is similar to function $NT_1$, described hereinabove with reference to FIG. 3, except that function $NT_3$ is smoother, since the slopes of the component line segments change more gradually than in function $NT_1$. Thus, at a knee point 270 in FIG. 7, for example, the slope of function $NT_3$ is still discontinuous, but the change is not so abrupt as at the knees of $NT_1$. As in the preceding embodiments, the parameters of function $NT_3$ may be adjusted to any suitable values, and specific values and ranges are given below solely by way of example. FIG. 7 shows the straight line $p_{out}=p_{in}$ as a line segment 266 for reference.

Function $NT_3$ uses four line segments to implement the mapping, which transforms input pixels $p_{in}$ to output pixels $p_{out}$. The function uses a first line segment 259 to map input pixels having input values in a first range $U_1$, which extends from 0 to parameter BL, to the value 0, or another low value near 0. Alternatively, BL may be set to zero, in which case segment 259 is omitted.

The function uses a second line segment 260, having a slope of typically between 2 and 16, for example, 4, and an x-intercept equal to parameter BL, to map input pixels having input values in a second range $U_2$. The low end of range $U_2$ equals BL, and the high end of $U_2$ may extend to up to 50% of the maximum allowable input value. For example, for implementations in which the allowable input value range is 0 to 1023, the high end of $U_2$ may be between 80 and 120, such as 100.

The function uses a third line segment 262, having a slope lower than the slope of line segment 260, such as between 1.5 and 4, for example, 2, and an x-intercept equal to a parameter Q1, typically having a value of between 200 and 500, to map input pixels having input values in a third range $U_3$. Range $U_3$ extends from the high end of range $U_2$ to, typically, between 50% and 90% of the maximum allowable input value. For some applications, function $NT_3$ uses only three line segments to implement the mapping, and omits line segment 260.

The function uses a fourth line segment 264, which has a slope of exactly 1 in this example, and which intersects the origin, to map input pixels having input values in a fourth range $U_4$. Range $U_4$ extends from the high end of range $U_3$ to the maximum allowable input value. As noted earlier, the parameters that define ranges $U_1$, $U_2$, $U_3$, and/or $U_4$ may be configured by setting appropriate values in one or more configuration registers.

An implementation of function $NT_3$ in digital hardware may be similar to the implementation of function $NT_1$ described hereinabove with reference to FIG. 4. Specifically, a circuit that implements function $NT_3$ may remove from circuit 80 multiplier 82 and adder 84, and replace adder 86 by a subtractor unit, which subtracts parameter Q1 from input value $p_{in}$, followed by a multiplier unit that multiplies the output of the subtractor by 2.

Figure 8:
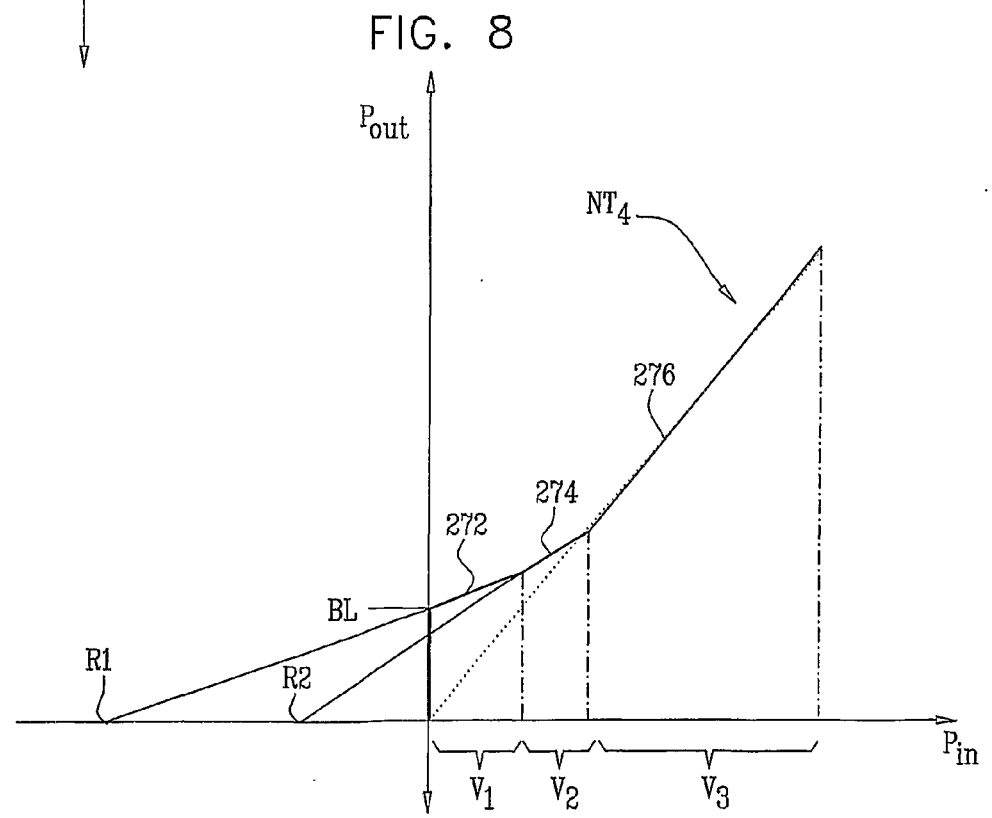
FIG. 8 is a graphical illustration of a piecewise linear function that implements a non-linear mapping that is generally inverse to the non-linear mapping depicted in FIG. 7, in accordance with an embodiment of the present invention.

FIG. 8 is a graphical illustration of a piecewise linear function $NT_4$, which implements a non-linear mapping that is generally inverse to the non-linear mapping implemented in function $NT_3$, in accordance with an embodiment of the present invention. The function maps the point ($p_{in}$=0) to the point ($p_{out}$=BL). The function uses a first line segment 272, having a slope that is the multiplicative inverse of the slope of line segment 260, for example, 0.25, and an x-intercept equal to a parameter R1 (where R1=−4*BL in this example), to map input pixels having input values in a range $V_1$. The function uses a second line segment 274, having a slope that is the multiplicative inverse of the slope of line segment 262, for example, 0.5, and an x-intercept equal to a parameter R2, to map input pixels having input values in range $V_2$. The function uses a third line segment 276, which overlaps with the line $p_{out}$=$p_{in}$, to map input pixels in range $V_3$. Typically, ranges $V_1$, $V_2$, and $V_3$ correspond to the ranges of values to which function $NT_3$ maps input pixels having input values in range $U_2$, $U_3$, and $U_4$, respectively (and thus the unity slope of segment 276 in range $V_3$ corresponds to the unity slope of segment 264 in range $U_4$). For some applications, the parameters that define ranges $V_1$, $V_2$, and/or $V_3$ may be configured by setting appropriate values in one or more configuration registers.

Figure 9:
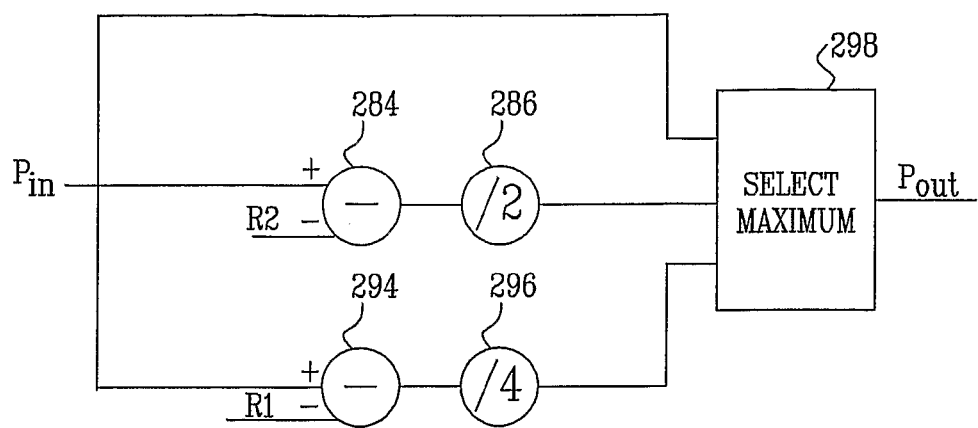
FIG. 9 is a schematic illustration of a digital hardware circuit that implements the piecewise linear function depicted in FIG. 8, in accordance with an embodiment of the present invention.

FIG. 9 is a schematic illustration of a digital hardware circuit 280 that implements piecewise linear function $NT_4$, in accordance with an embodiment of the present invention. Additional circuits for implementing function $NT_4$ will be evident to those skilled in the art who have read the present application, and are within the scope of the present invention. A first subtractor unit 284 subtracts parameter R2 from input pixel value $p_{in}$. (Assuming R2 to be negative, as shown in FIG. 8, this subtraction operation is equivalent to adding the absolute value of R2 to $p_{in}$.) A divide-by-2 unit 286 divides the output of subtractor 284 by 2. For some applications, circuit 280 may implement divide-by-2 unit 286 using a bit shifting element that shifts the output of subtractor 284 to the right by one bit. A second subtractor unit 294 subtracts parameter R1 from input pixel $p_{in}$. A divide-by-4 unit 296 divides the output of subtractor 294 by 4. For some applications, circuit 280 may implement divide-by-4 unit 296 using a bit shifting element that shifts the output of subtractor 294 to the right by two bits. Input pixel value $p_{in}$ and the outputs of divide-by-2 unit 286 and divide-by-4 unit 296 enter into a select maximum block 298, which outputs the correct value for output pixel value $p_{out}$.

Mode 2—Piecewise Linear Estimation with Curve Approximation

Figure 10:
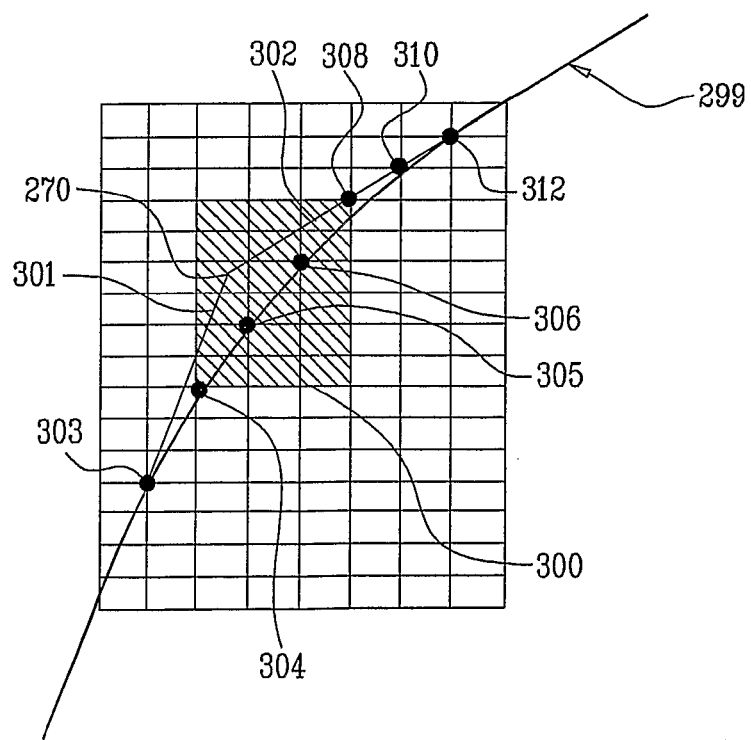
FIG. 10 is a graphical illustration of a non-linear mapping that uses a spline to smooth a knee in a piecewise linear transformation, in accordance with an embodiment of the present invention.

FIG. 10 is a graphical illustration of a non-linear mapping 299 that uses a spline to smooth knee 270, in accordance with an embodiment of the present invention. Knee 270 (as shown in FIG. 7, for example) is caused by a transition between line segments of differing slopes in a piecewise linear transformation. Knees of this sort sometimes cause undesirable effects in the output pixel stream from circuit 26, which may lead to artifacts in the image produced by ISP 28. Circuit 26 reduces or eliminates these undesirable effects by replacing the line segments in a neighborhood 300 (represented by the shaded area in FIG. 10) of knee 270 with a smoother curve, such as a spline. While the description that follows describes the use of a spline to smooth knee 270, other methods for smoothing knees in curves may be used, as will be readily apparent to one skilled in the art.

Non-linear mapping 299 comprises three sets of points: A first set of points lies on a line segment 301 (only a point 303 in this set is shown in the figure). A second set of points, comprising points 304, 305, and 306, is in neighborhood 300 of knee 270 and lies on the spline. A third set of points, of which points 308, 310, and 312 are shown in the figure, lies on a line segment 302. Substitution of the portions of line segments 301 and 302 in neighborhood 300 of knee 270 by spline points 304, 305, and 306 causes mapping 299 to be smoother and to better approximate a curve.

Figure 11:
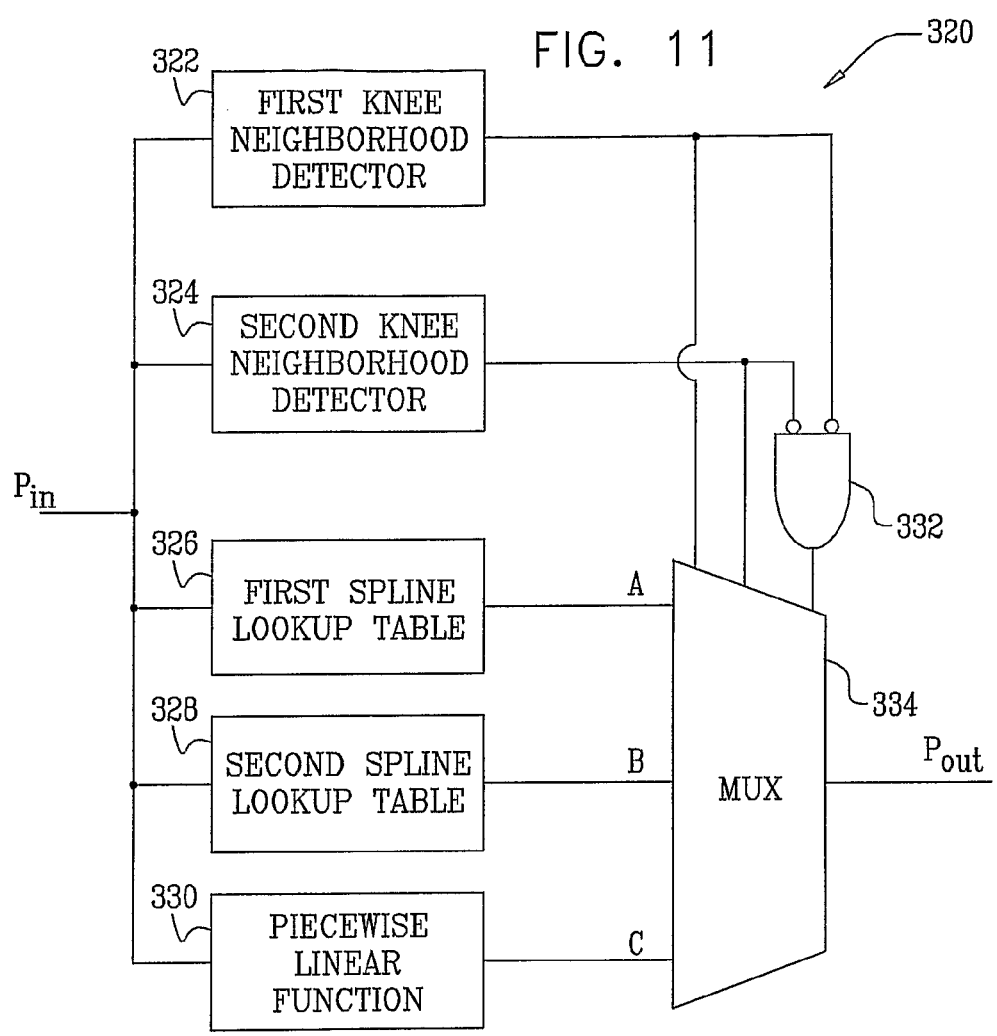
FIG. 11 is a schematic illustration of a digital hardware circuit that implements a non-linear mapping that uses splines to smooth knees in a piecewise linear transformation, in accordance with an embodiment of the present invention.

FIG. 11 is a schematic illustration of a digital hardware circuit 320 that implements a non-linear mapping that uses splines to smooth knees in a piecewise linear transformation, in accordance with an embodiment of the present invention. While circuit 320 may smooth any number of knees present in the piecewise linear transformation, in this example, and in the description that follows, circuit 320 is designed to smooth two knees using spline insertion. Additional circuits for implementing non-linear mappings that use splines to smooth knees will be evident to those skilled in the art who have read the present application, and are within the scope of the present invention.

A piecewise linear function unit 330 performs a piecewise linear transformation whose graph has two knees, for example, the transformation $NT_1$, which is described hereinabove with reference to FIGS. 3 and 4. A first spline lookup table 326 constructs a smooth curve in a neighborhood of a first knee by associating some or all values of $p_{in}$ with respective output pixel values. A second spline lookup table 328 constructs a smooth curve in a neighborhood of a second knee. Typically, spline lookup tables 326 and 328 specify output pixel values only for input pixels in the neighborhood of the first knee or the second knee, respectively, and not for all input values of $p_{in}$. In an embodiment of the present invention, spline lookup tables 326 and 328 use the value of the input pixel as an index. Alternatively, the spline lookup tables use as the index a difference between the value of the lowest-amplitude pixel in the neighborhood of the first or second knee, respectively, and the value of input pixel $p_{in}$. Alternatively or additionally, spline lookup tables 326 and 328 associate some or all input pixel values with respective offset values, and circuit 320 adds the outputs of tables 326 and 328 to constant base pixel values, respectively, thus allowing circuit 320 to implement tables 326 and 328 with a memory element having fewer output bits than the width in bits of input pixel value $p_{in}$.

A first knee neighborhood detector 322 detects whether input pixel value $p_{in}$ is in the neighborhood of the first knee. For some applications, circuit 320 defines a knee range that includes values of input pixels that are in the neighborhood of the first knee, and detector 322 compares the input pixel with the lower and upper ends of the knee range to decide whether the input pixel value is in the vicinity of the knee. For example, circuit 320 may use two digital comparators, one for the upper end and one for the lower end of the knee range, and one logical gate, to implement detector 322. A second knee neighborhood detector 324 works similarly to first knee neighborhood detector 322, but with comparator values corresponding to the second knee.

If first knee neighborhood detector 322 indicates that the input pixel is in the neighborhood of the first knee, a multiplexer (mux) 334 chooses the output of first spline lookup table 326. If second knee neighborhood detector 324 indicates that the input pixel is in the neighborhood of the second knee, mux 334 chooses the output of second spline lookup table 328. If, on the other hand, knee neighborhood detectors 322 and 324 indicate that the input pixel is not in the neighborhood of either the first or the second knee, respectively, mux 334 chooses the output of piecewise linear function unit 330. Circuit 320 may implement selector logic for mux 334, for example, using a NAND gate 332 on the output of knee neighborhood detectors 322 and 324.

Mode 3—Piecewise Linear Estimation Using Sparse Look-Up Table

Figure 12:
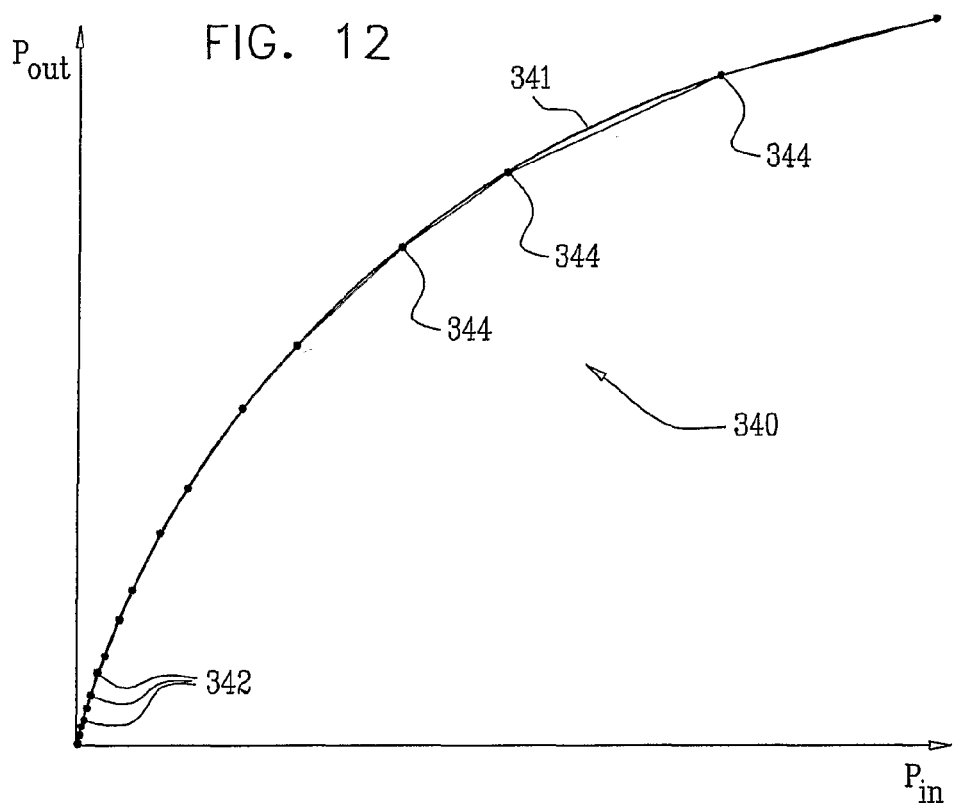
FIG. 12 is a graphical illustration of a piecewise linear transformation that uses varying segment lengths to approximate a smoothly curved non-linear mapping, in accordance with an embodiment of the present invention.

FIG. 12 is a graphical illustration of a piecewise linear transformation 340 that uses multiple segments of varying segment lengths to approximate a smoothly curved non-linear mapping 341, in accordance with an embodiment of the present invention. Transformation 340 approximates non-linear mapping 341 using shorter line segments in a low-amplitude range of pixel values 342, and longer line segments in a high-amplitude range of pixel values 344.

Figure 13:
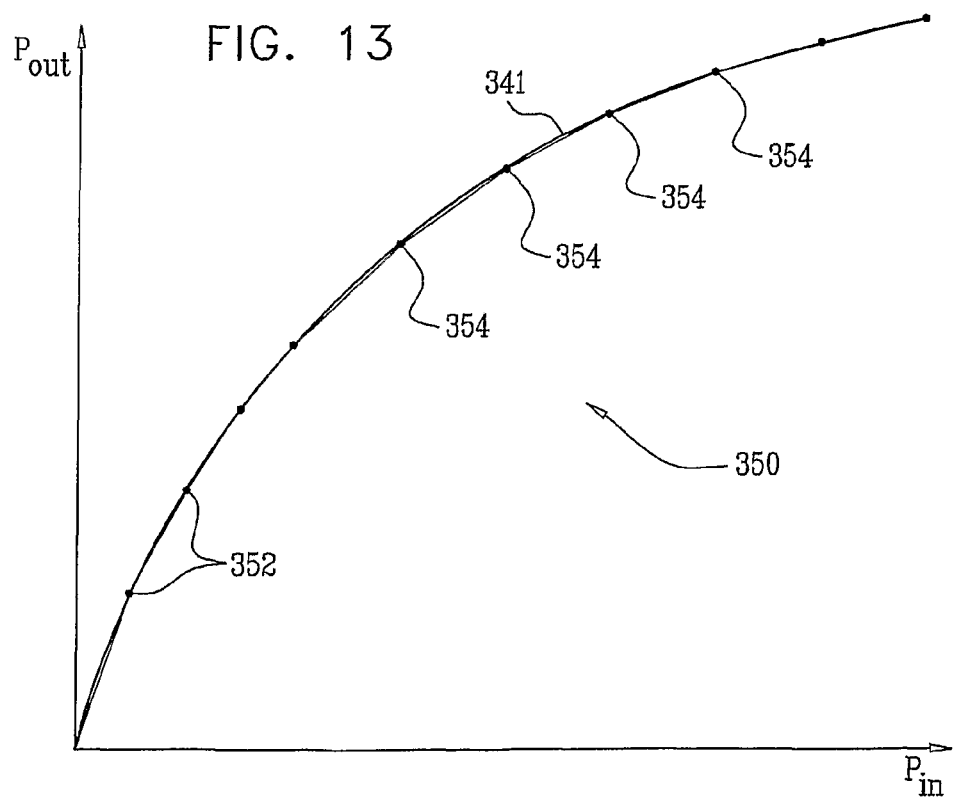
FIG. 13 is a graphical illustration of another piecewise linear transformation that uses varying segment lengths to approximate a smoothly curved non-linear mapping, in accordance with an embodiment of the present invention.

FIG. 13 is a graphical illustration of a piecewise linear transformation 350 that approximates smoothly curved non-linear mapping 341 using a different set of segments, in accordance with another embodiment of the present invention. Transformation 350, in contrast to transformation 340 (FIG. 12), approximates non-linear mapping 341 using longer line segments in a low-amplitude range of pixel values 352, and shorter line segments in a relatively high-amplitude range of pixel values 354. In some cases, transformation 350 approximates non-linear mapping 341 with greater accuracy than does transformation 340.

Figure 14:
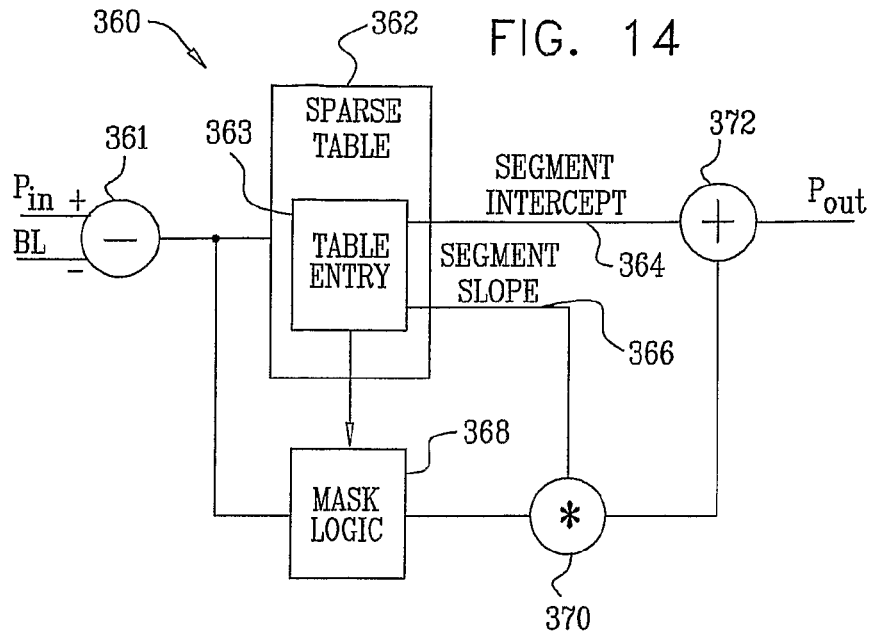
FIG. 14 is a schematic illustration of a digital hardware circuit that implements a piecewise linear transformation that approximates a smooth curve by using a sparse lookup table to obtain varying segment lengths, in accordance with an embodiment of the present invention.

FIG. 14 is a schematic illustration of a digital hardware circuit 360 that implements a piecewise linear transformation of the sort shown in FIGS. 12 and 13, in accordance with an embodiment of the present invention. Circuit 360 approximates a smooth curve using a sparse lookup table 362, with entries corresponding to varying segment lengths. Additional circuits for implementing piecewise linear transformations that approximate smooth curves by using sparse lookup tables will be evident to those skilled in the art who have read the present application, and are within the scope of the present invention.

Sparse lookup table 362 contains a number of table entries equal to the number of line segments that make up the piecewise linear transformation. Thus, the difference in value between each two neighboring table entries establishes the number of input pixel values that the transformation maps via a specific line segment. In relatively sharply-curved areas of the transformation, sparse lookup table 362 contains many table entries that are closely spaced. In relatively gradually-curved areas of the transformation, on the other hand, sparse lookup table 362 contains fewer table entries that are spaced further apart.

A subtractor element 361 subtracts parameter BL from input pixel values $p_{in}$, so that input pixel values below BL are mapped to zero. (Alternatively, an equivalent effect may be obtained by appropriate choice of lookup table parameters.) The output of subtractor 361 serves as the key to sparse lookup table 362, which associates each input pixel value with a chosen table entry 363, typically by choosing a table entry having a key value that is closest to, but not greater than, the input pixel value. Sparse lookup table 362 maps each table entry to a segment intercept 364 and a segment slope 366. Therefore, each table entry uniquely defines a line segment by its slope and its intercept. A mask logic unit 368 subtracts chosen table entry 363 from the value of the input pixel and, a multiplier unit 370 then multiplies the output of mask logic unit 368 by segment slope 366. An adder unit 372 adds the output of multiplier unit 370 to segment intercept 364 to obtain the output pixel value $p_{out}$.

In an embodiment of the present invention, in which input pixel value $p_{in}$ and output pixel value $p_{out}$ are 12 bit values, circuit 360 uses sparse lookup table 362 with 19 table entries. Table 1 is an example of such a table, for 12-bit input pixels, which uses longer line segments for relatively high-amplitude pixels and shorter line segments for relatively high-amplitude pixels, as described hereinabove with reference to FIG. 12. (Alternatively, the same table may be used for 10-bit input pixel values simply by truncating the two least significant bits in each table entry.) Each entry provides a slope and intercept for the corresponding segment, wherein the slopes typically decrease while the intercepts increase with increasing entry number.

TABLE 1

| Entry Number | Table Entry |
|---|---|
| 19 | 11xx xxxx xxxx |
| 18 | 10xx xxxx xxxx |
| 17 | 011x xxxx xxxx |
| 16 | 010x xxxx xxxx |
| 15 | 0011 xxxx xxxx |
| 14 | 0010 xxxx xxxx |
| 13 | 0001 1xxx xxxx |
| 12 | 0001 0xxx xxxx |
| 11 | 0000 11xx xxxx |
| 10 | 0000 10xx xxxx |
| 9 | 0000 011x xxxx |
| 8 | 0000 010x xxxx |
| 7 | 0000 0011 xxxx |
| 6 | 0000 0010 xxxx |
| 5 | 0000 0001 1xxx |
| 4 | 0000 0001 0xxx |
| 3 | 0000 0000 11xx |
| 2 | 0000 0000 10xx |
| 1 | 0000 0000 0000 |

An "x" in Table 1 indicates a "do not care" bit value, meaning that the value of the bit in question in the input pixel does not affect the functioning of the table.

For applications in which circuit 360 uses table 362 as shown in Table 1, table 362 locates table entry 363 for any given input pixel value $p_{in}$ by observing only the leftmost asserted ("1") bit in the binary representation of the input pixel and a neighboring bit immediately to the right of the leftmost "1" bit. Table 362 chooses for input pixel value $p_{in}$ the table entry whose leftmost "1" bit and neighbor bit are equal to those of the input pixel value. For example, for the input pixel value 0001 0011 1101, table 362 finds that the bits "10" in positions fourth and fifth from left, respectively, which are the leftmost asserted bit of the input pixel value and its right-hand neighbor bit, correspond to table entry number 12. For applications in which circuit 360 uses sparse lookup table 362 in this manner, mask logic unit 368 typically obtains the difference between chosen table entry 363 and the value of the input pixel by masking (i.e., setting to zero) the leftmost "1" bit in the binary representation of the input pixel and the bit immediately to the right of the leftmost "1" bit. Multiplier unit 370 then multiplies the result of this masking operation by the appropriate segment slope 366.

Although Table 1 illustrates sparse lookup table 362 for bit vectors of width 12, it will be readily appreciated by one skilled in the art that lookup table 362 may be adapted for any width of bit vector.

In another embodiment of the present invention, in which both input pixel value $p_{in}$ and output pixel value $p_{out}$ are 10 bit values, sparse lookup table 362 may have 10 table entries. The following is an example of such a table, which uses longer line segments for relatively low-amplitude pixels and shorter line segments for relatively high-amplitude pixels, as described hereinabove with reference to FIG. 13:

TABLE 2

| Entry Number | Table Entry |
| --- | --- |
| 10 | 11 1xxx xxxx |
| 9 | 11 0xxx xxxx |
| 8 | 10 1xxx xxxx |
| 7 | 10 0xxx xxxx |
| 6 | 01 10xx xxxx |
| 5 | 01 00xx xxxx |
| 4 | 00 11xx xxxx |
| 3 | 00 10xx xxxx |
| 2 | 00 01xx xxxx |
| 1 | 00 0xxx xxxx |

In this exemplary table, sparse lookup table 362 uses a subset of the bits of input pixel value $p_{in}$, for example, the most significant "1" and one or two neighboring bits, to associate table entry 363 with input pixel value $p_{in}$.

Figure 15:
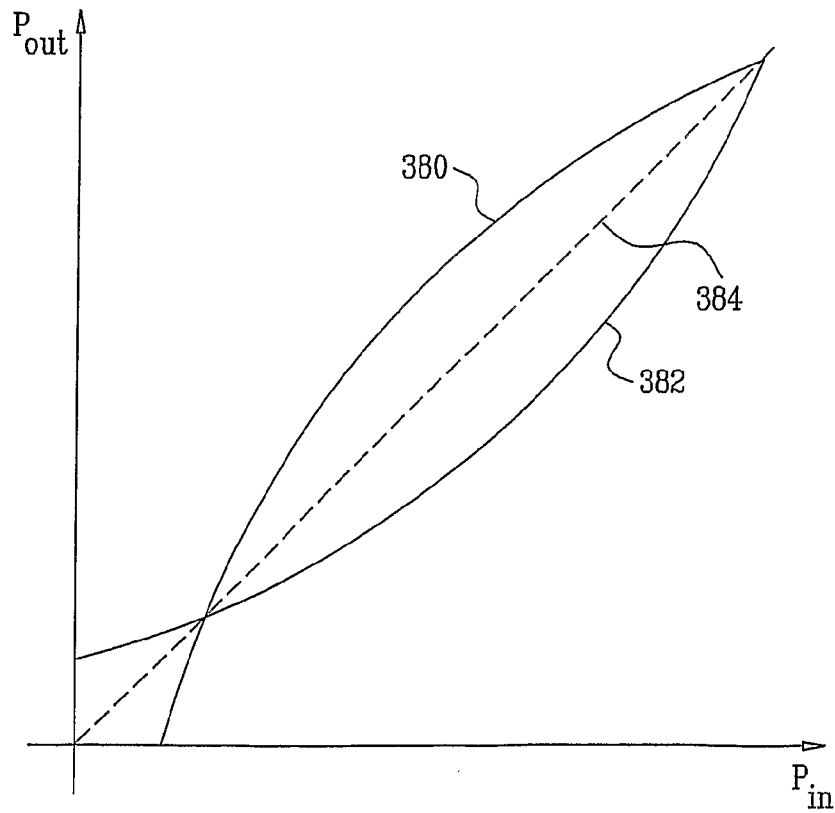
FIG. 15 is a graphical illustration of non-linear mapping functions, in accordance with an embodiment of the present invention.

FIG. 15 is a graphical illustration of a mapping function 380 and a mapping function 382 that is generally inverse to function 380, in accordance with an embodiment of the present invention. Functions 380 and 382 may be approximated by piecewise linear functions, using one or more of the techniques described above. Function 382 is a reflection of function 380 across a line $p_{out}=p_{in}$ 384. In an embodiment of the present invention, a digital hardware circuit that implements inverse function 382 with a sparse lookup table uses the same basic architecture as circuit 360, described hereinabove with reference to FIG. 14. The circuit replaces sparse lookup table 362 with a new sparse lookup table that produces inverse function 382. For some applications, the new sparse lookup table uses the same entries as table 362, replacing only the values of segment slopes 364 and segment intercepts 366 for the entries. In addition, to generate function 382, subtractor 361 is removed, and an additional adder element adds parameter BL to the output of adder 372. (Alternatively, the value BL may simply be added to segment intercept 364.)

FIG. 16 is a schematic illustration of an exemplary non-linear mapping 400, in accordance with an embodiment of the present invention. A function domain 402 includes a spectrum of allowed input values for a non-linear mapping function, for example, the values from 0 to 255 for an 8-bit input domain. A function range 404 contains a spectrum of allowed output values for the non-linear mapping function, likewise from 0 to 255 in the present example. Subsets of domain 402 and range 404 are characterized by sub-domain and sub-range lengths, respectively, which are defined as the difference between the highest and lowest values of members of the subsets of the domain and the range, respectively. A low-amplitude sub-domain 406 comprises a non-empty subset of domain 402 that contains values from domain 402 having relatively low amplitudes, for example, between 20 and 40. A low-amplitude sub-range 408 comprises a non-empty subset of range 404 that contains values from range 404 having relatively low amplitudes, for example, between 60 and 120. The non-linear mapping function performs low-amplitude expansion by mapping members of low-amplitude sub-domain 406 to low-amplitude sub-range 408, whose length is greater than the length of sub-domain 406. Similarly, a high-amplitude sub-domain 410 comprises a non-empty subset of domain 402 that contains values from domain 402 having high relative amplitudes, for example, between 150 and 220. For some applications, the non-linear mapping function performs high-amplitude compression by mapping members of sub-domain 402 to a high-amplitude sub-range 412, whose length is less than the length of sub-domain 410.

FIG. 17 is an exemplary graph 418 including a curve 420 representing non-linear mapping 400 of FIG. 16, in accordance with an embodiment of the present invention. The x- and y-axes of graph 418 represent input and output values, respectively, of the non-linear mapping function. As can be seen in the figure, the mapping function performs a low-amplitude expansion of sub-domain 406 to sub-range 408, and a high-amplitude compression of sub-domain 410 to sub-range 412.

In an embodiment of the present invention, graph 418 implements curve 420 using a power law function, for example, of the form given in Equation 3 below.

$$p_{out}=M^{(1-x)}*p_{in}^{x} \quad \text{(Equation 3)}$$

In this exemplary function, M is the minimum value of input pixel value $p_{in}$, and x<1. The function applies a gain that is greatest for the lowest pixel values and is normalized to be 1 for the maximum pixel value. The function keeps the same dynamic range of output pixel values as input pixel values, but redistributes the pixel values so that the low range of input values is mapped to a wider range of output values, while the high range of input values is compressed into a narrower range of output values. The mapping of Equation 3 may be approximated by a piecewise linear function, as described above.

Alternatively, graph 418 may use another power law function, for example, of the form $y=(a*(x-b)^n)+c$, where n<1, a>0.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

In all of the figures described hereinabove no reference is made to widths of signals or buses, and it will be readily appreciated by one skilled in the art that the circuits described may be implemented for any width of signals, parameters, registers, and configuration values. Similarly, various implementation details of digital logic components such as adders, multipliers, and multiplexers, will be apparent to one skilled in the art, including but not limited to use of fixed point or floating point arithmetic, and synchronous and combinational design. It will likewise be appreciated by one skilled in the art that the components may be implemented using various techniques known in the art, including software-based implementations on programmable components, such as microprocessors or field-programmable logic devices.

The invention claimed is:

1. Imaging apparatus, comprising:
   a first non-linear mapping circuit, which is configured to receive a stream of input pixel values and to implement a first non-linear mapping function to map the input pixel values to a mapped stream of mapped pixel values, wherein the input pixel values have an input blur caused by a point spread function (PSF) of a set of objective optics, wherein the input pixel values include a first subset of low-amplitude pixel values having a first range of amplitude values, and wherein the first non-linear mapping function maps the first subset of low-amplitude pixel values to a first corresponding subset of mapped pixel values having a first mapped range of amplitude values that is greater than the first range of amplitude values, such that the first non-linear mapping function causes the first subset of low-amplitude pixel values to be spread out over a larger range of mapped pixel values; and a linear convolution filter, which is configured to filter the mapped stream of mapped pixel values to generate a filtered stream of filtered pixel values, wherein the linear convolution filter comprises a deconvolution filter, which has a filter kernel determined according to the PSF, and which is configured to filter the mapped pixel values to cause the filtered pixel values to have less blur than the input pixel values.

2. The apparatus according to claim 1, wherein the first non-linear mapping circuit is configured to implement the first non-linear mapping function to map each of the input pixel values individually, irrespective of any neighboring input pixel values.

3. The apparatus according to claim 1, wherein the raw stream of input pixel values includes at least 100,000 input pixel values, and wherein the first non-linear mapping circuit is configured to implement the first non-linear mapping function such that at least 10% of the mapped pixel values are different from the corresponding input pixel values.

4. The apparatus according to claim 1, further comprising:
a second non-linear mapping circuit, which is configured to receive the filtered stream of filtered pixel values and to implement a second non-linear mapping function to map the filtered pixel values to an output stream of output pixel values, wherein the second non-linear mapping function is an inverse of the first non-linear mapping function for at least a range of allowable filtered pixel values.

5. The apparatus according to claim 1, wherein the first non-linear mapping function includes a power law transformation, and wherein the first non-linear mapping circuit is configured to perform the power law transformation.

6. The apparatus according to claim 1, wherein the first non-linear mapping function comprises a piecewise linear function, and wherein the first non-linear mapping circuit is configured to implement the piecewise linear function.

7. The apparatus according to claim 6, wherein the first non-linear mapping circuit is configured to use curve approximation to smooth knees in the piecewise linear function.

8. The apparatus according to claim 6, wherein the piecewise linear function includes a plurality of segments, and wherein the first non-linear mapping circuit comprises a sparse lookup table having respective entries that specify the segments.

9. The apparatus according to claim 1, wherein the stream of input pixel values is provided by a mosaic image sensor, and wherein the stream of input pixel values belongs to a plurality of interleaved input sub-images, each input sub-image responsive to light of a different, respective color that is incident on the mosaic image sensor, and wherein the first non-linear mapping circuit is configured to generate a plurality of interleaved output sub-images respectively, and wherein the apparatus further comprises an image signal processor (ISP), which is coupled to receive and combine the plurality of output sub-images in order to generate a color video output image.

10. The apparatus according to claim 1, wherein the first non-linear mapping circuit is configured to dynamically alter the first non-linear mapping function responsively to one or more characteristics of the input pixel values.

11. The apparatus according to claim 1, wherein the raw stream of input pixel values further includes a second subset of high-amplitude pixel values having a second range of amplitude values, and wherein the first non-linear mapping function maps the second subset of high-amplitude pixel values to a second corresponding subset of the mapped pixel values having a second mapped range of amplitude values that is smaller than the second range of amplitude values such that the first non-linear mapping function causes the second subset of high-amplitude pixel values to be compressed into a smaller range of mapped pixel values.

12. A method for imaging, comprising:
receiving a stream of input pixel values, wherein the input pixel values have an input blur caused by a point spread function (PSF) of a set of objective optics, and wherein the input pixel values include a first subset of low-amplitude pixel values having a first range of amplitude values;

performing a first non-linear mapping function to map the input pixel values to a mapped stream of mapped pixel values, wherein the first non-linear mapping function maps the first subset of low-amplitude pixel values, having the first range of amplitude values, to a first corresponding subset of mapped pixel values having a first mapped range of amplitude values that is greater than the first range of amplitude values, such that the first non-linear mapping function causes the first subset of low-amplitude pixel values to be spread out over a larger range of mapped pixel values; and applying a linear convolution filter to the mapped stream of mapped pixel values to generate a filtered stream of filtered pixel values, wherein the linear convolution filter comprises a deconvolution filter, which has a filter kernel determined according to the PSF, and which filters the mapped pixel values to cause the filtered pixel values to have less blur than the input pixel values.

13. The method according to claim 12, wherein performing the first non-linear mapping function comprises performing the first non-linear mapping function to map each of the input pixel values individually, irrespective of any neighboring input pixel values.

14. The method according to claim 12, wherein the stream of input pixel values includes at least 100,000 of the input pixel values, and wherein performing the first non-linear mapping function comprises performing the first non-linear mapping function such that at least 10% of the mapped pixel values are different from the corresponding input pixel values.

15. The method according to claim 12, further comprising:
performing a second non-linear mapping function to map the filtered pixel values to an output stream of output pixel values, wherein the second non-linear mapping function is an inverse of the first non-linear mapping function for at least a range of allowable filtered pixel values.

16. The method according to claim 12, wherein performing the first non-linear mapping function comprises performing a power law transformation.

17. The method according to claim 12, wherein performing the first non-linear mapping function comprises performing a piecewise linear mapping function.

18. The method according to claim 17, wherein performing the piecewise linear mapping function comprises using curve approximation to smooth knees in the piecewise linear mapping function.

19. The method according to claim 17, wherein performing the piecewise linear mapping function comprises using a sparse lookup table having respective entries that specify a plurality of piecewise linear segments.

20. The method according to claim 12, wherein the stream of input pixel values is provided by a mosaic image sensor, wherein the stream of input pixel values belongs to a plurality of interleaved input sub-images, each input sub-image responsive to light of a different, respective color that is incident on the mosaic image sensor, wherein performing the first non-linear mapping function comprises generating a plurality of interleaved output sub-images respectively, and wherein the method further comprises receiving and combining the plurality of output sub-images in order to generate a color video output image.

21. The method according to claim 12, wherein performing the first non-linear mapping function comprises dynamically altering the first non-linear mapping function responsively to one or more characteristics of the input pixel values.

22. The method according to claim 12, wherein the raw stream of input pixel values further includes a second subset of relatively high-amplitude pixel values having a second range of amplitude values, and wherein performing the first non-linear mapping function comprises mapping the second subset of high-amplitude pixel values to a second corresponding subset of the mapped pixel values having a second mapped range of amplitude values that is smaller than the second range of amplitude values, such that the first non-linear mapping function causes the second subset of high-amplitude pixel values to be compressed into a smaller range of mapped pixel values.

* * * * *

UNITED STATES PATENT AND TRADEMARK OFFICE
CERTIFICATE OF CORRECTION

| | | |
|---|---|---|
| PATENT NO. | : 8,547,444 B2 | Page 1 of 1 |
| APPLICATION NO. | : 12/663205 | |
| DATED | : October 1, 2013 | |
| INVENTOR(S) | : Uri Kinrot et al. | |

It is certified that error appears in the above-identified patent and that said Letters Patent is hereby corrected as shown below:

In the claims:

Column 19:

Claim 3, line 17, delete "raw"

Claim 9, line 59, after "of" insert --the--

Claim 11, line 65, delete "raw"

Column 20:

Claim 11, line 3, delete "the"

Claim 14, line 40, delete "of the"

Column 21:

Claim 22, line 16, delete "raw"

Claim 22, line 18, delete "relatively"

Claim 22, line 22, delete "the"

Signed and Sealed this
Eighth Day of July, 2014

Michelle K. Lee
*Deputy Director of the United States Patent and Trademark Office*